July 9, 1957          D. MULLAN          2,798,514
MACHINE FOR MANUFACTURING TUBULAR LAMPS
Filed March 28, 1952          4 Sheets-Sheet 1
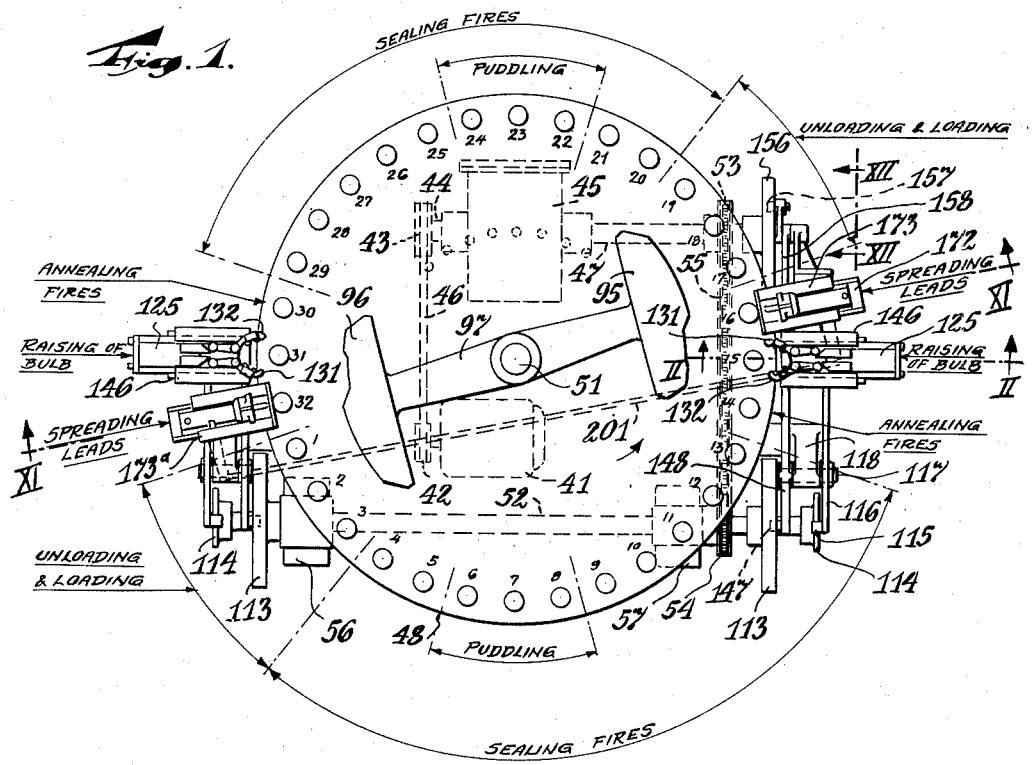
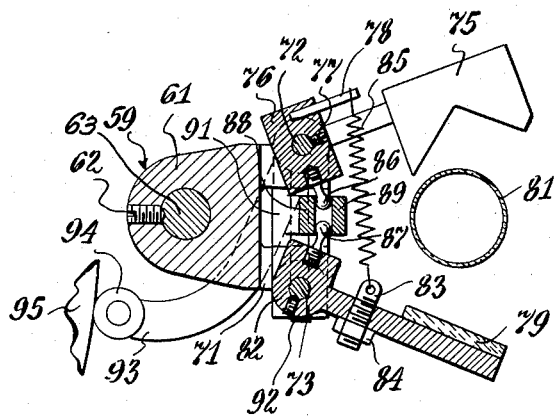
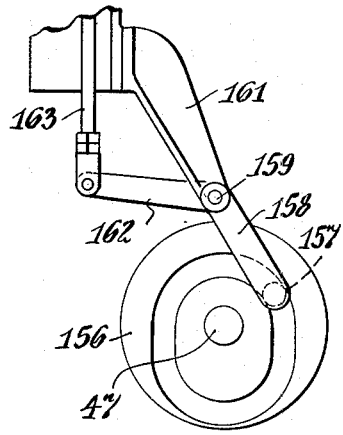
INVENTOR
DANIEL MULLAN.
BY
ATTORNEY

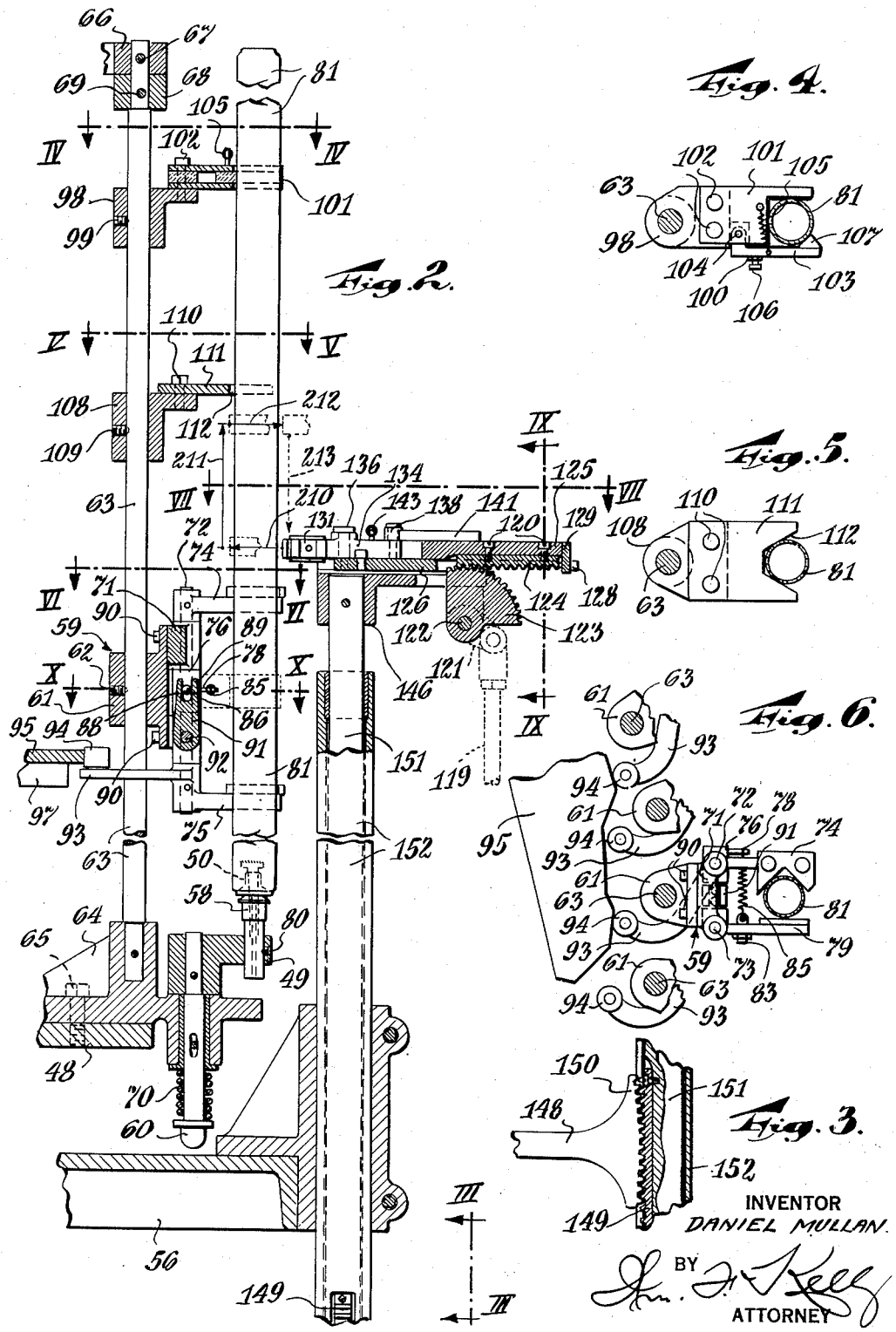

INVENTOR
DANIEL MULLAN.
BY
ATTORNEY

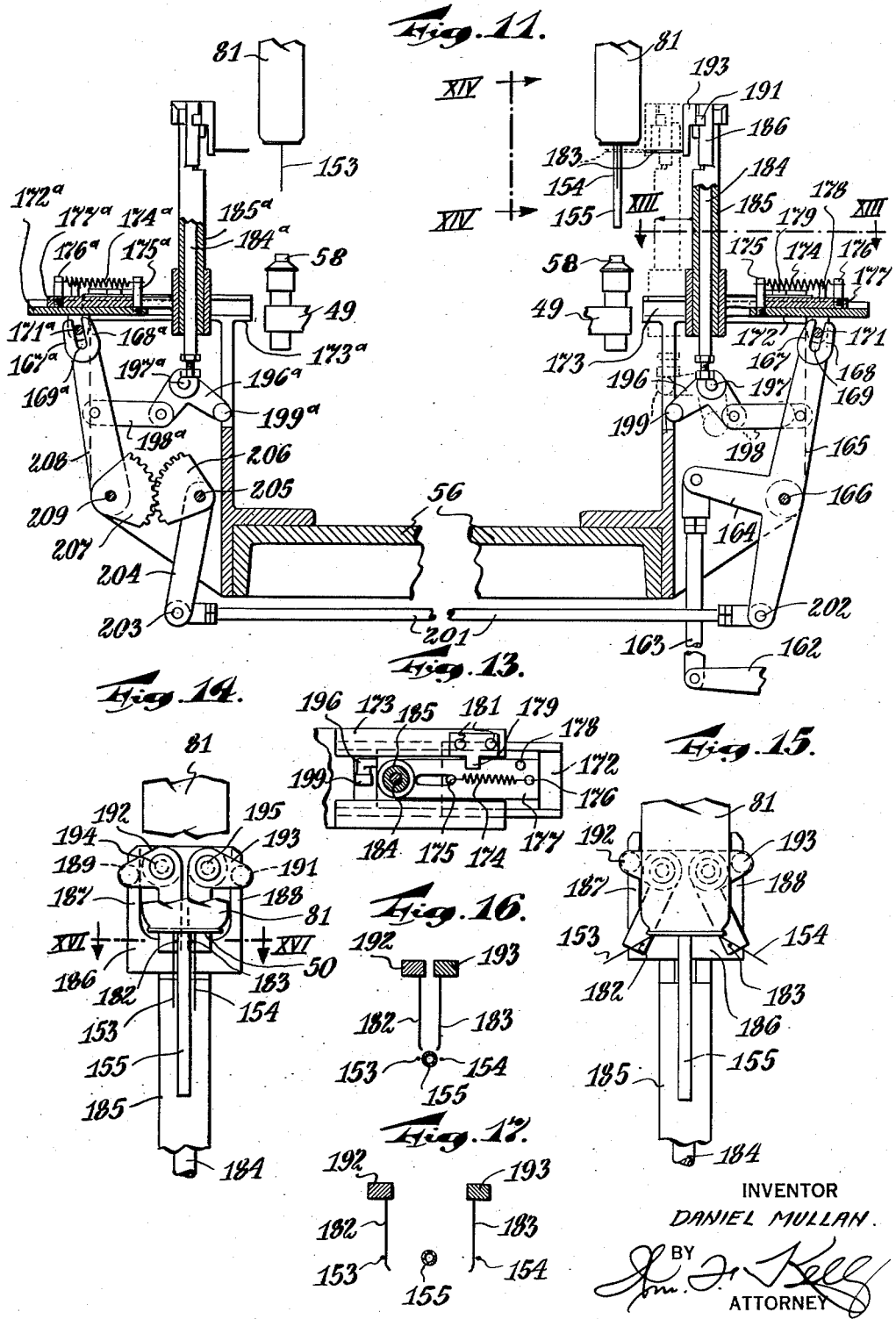

United States Patent Office 2,798,514
Patented July 9, 1957

2,798,514

MACHINE FOR MANUFACTURING
TUBULAR LAMPS

Daniel Mullan, Hillside, N. J., assignor to Westinghouse Electric Corporation, East Pittsburgh, Pa., a corporation of Pennsylvania Application March 28, 1952, Serial No. 279,135

2 Claims. (Cl. 140—71.5)

This invention relates to sealing mounts into tubular bulbs while held in clamps on an indexing conveyor thereof, moving said bulbs axially to elevated position in said clamps, separating the lead wires at the lower ends of said bulbs, and releasing said clamps for allowing withdrawal or return to said machine in reverse position.

The principal object of my invention, generally considered, is to provide a machine for manufacturing tubular lamps in which breaking of the exhaust tube through improper or careless manual removal of the lamp bulb is avoided, while at the same time the lead wires are automatically separated and the bulb thereafter released for removal or turning to reverse position for processing the opposite end thereof.

Another object is to provide, on a machine for manufacturing tubular lamps, a pair of bulb raising jaws, cam operated through levers and a gear, and which move toward and close about a bulb, and then rise to remove the exhaust tube at the lower end of said bulb from the mount holder to thereby avoid breaking of the exhaust tube.

A further object is to provide, on a machine for manufacturing tubular lamps, a bulb holding clamp for holding bulbs in position during processing, and a cam for operating said clamp to release the bulb while being raised by appropriate jaws and grip it after release by said jaws.

A still further object is to provide, on a machine for manufacturing tubular lamps, a lead wire spreader holder carrying a pair of fingers or prongs movable toward and away from one another, and a cam for effecting movement to said prongs to a position between depending lead wires of a tubular bulb carried by said machine and then separating said lead wires to a predetermined angle, suitable for making contact with the exhaust machine's filament lighting tracks, to prepare the bulb for exhaustion, tipping off and seasoning.

Other objects and advantages of the invention will become apparent as the description proceeds.

Referring to the scale drawings, in which like parts are designated by like reference characters, Figure 1 is a plan of a machine embodying my invention.

Figure 2 is a vertical sectional view to a larger scale and on the line II—II of Figure 1, in the direction of the arrows.

Figure 3 is a fragmentary elevational view on the line III—III of Figure 2, in the direction of the arrows.

Figures 4, 5 and 6 are fragmentary horizontal sectional views of the lamp holding clamp on the correspondingly numbered lines of Figure 2, in the direction of the arrows.

Figure 10 is a fragmentary horizontal sectional view of the lower bulb holder jaw assembly on the line X—X of Figure 2, in the direction of the arrows.

Figure 11 is a fragmentary vertical elevational view, of the wire spreading mechanism with parts in section on the line XI—XI of Figure 1, in the direction of the arrows.

Figure 12 is a fragmentary elevational view of the drive mechanism of the wire spreading mechanism on the line XII—XII of Figure 1, in the direction of the arrows.

Figure 13 is a fragmentary horizontal view of the wire spreader mechanism on the line XIII—XIII of Figure 11, in the direction of the arrows.

Figure 14 is a fragmentary elevational view on the line XIV—XIV of Figure 11, in the direction of the arrows.

Figure 15 is a view, generally correspondinng to Figure 14, but showing the position of the parts upon separation of the lead wires depending from a bulb being processed.

Figure 16 is a horizontal sectional view on the line XVI—XVI of Figure 14, in the direction of the arrows.

Figure 17 is a view corresponding to Figure 16, but showing the prongs after separation.

Figure 7:
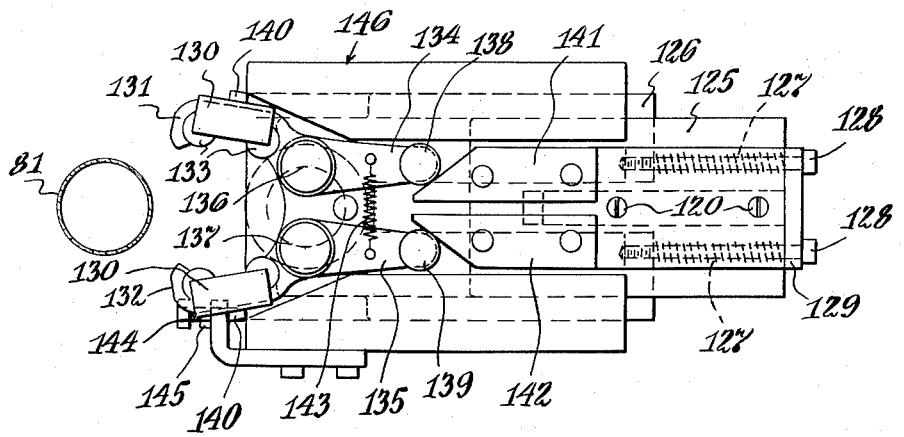
Figure 7 is a fragmentary horizontal sectional view on the line VII—VII of Figure 2, in the direction of the arrows, and showing in plan the lamp-gripping jaws of the bulb lifting mechanism open and in retracted position.

The embodiment of the present invention is a machine designed to raise tubular bulbs and mounts such, for example, as used in the manufacture of fluorescent lamps, from a sealing position to a point where the exhaust tubes are clear of the burner and mount support or tip, thereby precluding breaking of exhaust tubes through improper or careless manual removal of the bulb. The machine also spreads the lead wires of mounts, which have been sealed to bulbs, to an angle suitable for making contact with the exhaust machine filament lighting tracks. It also embodies novel bulb-holding clamps and mechanism for automatically operating the same.

*Driving mechanism*

Referring to the drawings in detail, and especially Figure 1, there is shown apparatus embodying my invention and driven from a single source of power, such as an electric motor 41, so that the parts operate in the desired synchronism. The motor has a pulley or sprocket wheel 42 on its shaft, which drives a pulley or sprocket wheel 43 on a shaft 44 projecting from reduction gear box 45, by means of a belt or chains 46. All of the foregoing parts may be supported from the base (not shown) of the machine. The turning of the shaft 44 causes turning of the shaft 47 to which it is geared.

*Indexing mechanism*

Also driven step-by-step, from one station to another, from the same shaft 44, is the spider 48 (see Fig. 2) of the machine carrying heads 49 which revolve about a vertical shaft or standard 51 upstanding from the machine base. The spider 48 is driven through mechanism in the gear box 45, including a cam wheel (not shown) with axially offset portions sequentially engaging rollers (not shown) on arms (not shown) outstanding from the shaft 51, and to which they are secured. Such mechanism being standard in such equipment (see, for example, the drive, as shown in U. S. Patent No. 2,569,852, issued October 2, 1951 to J. Greene, for the spider 106 through its vertical shaft 108 by gear 112 carried threon and formed by a series of rollers 113, driven by wheels 114 formed with a trough portion which joins axially-offset trough portions 120 and 130; with which the unillustrated present cam wheel may correspond; forming a cam device for driving the spider, from indexing at one station to indexing at the next) is not illustrated in detail.

*Cam shaft mechanism*

Motion is also transmitted from shaft 47 to cam shaft 52 by means of a sprocket whel 53 on shaft 47, driving a sprocket wheel 54 on shaft 52 through chain 55. The shaft 52 is journaled in bearing or frame portions 56 and 57 (Figs. 2 and 11), upstanding from the base of the machine, and carries a pair of cams at each end. Inasmuch as the mechanism at the left end of the shaft 52, as viewed in Fig. 1, is substantially identical with that of the right end of said shaft, only the mechanism at said right end will be described in detail.

General machine operation

The spider 48, in its step-by-step rotation about shaft 51, thereby moves each of its heads 49 through, while erspectively indexing at, a series of stations, which I have numbered 1 through 32 (Fig. 1). Stations "1," "2" and "3" are for unloading and loading tubular bulbs 81 and placing tubulated mounts 50, on the corresponding mount holders 58 (Fig. 2), held in adjusted position on the heads 49, by means of set screws 80 for sealing the latter to the lower ends thereof. Stations "4" to "13," inclusive, are for sealing such mounts to said bulbs, stations "6," "7" and "8," thereof, being such at which relative movement is effected, as by means of cams (not shown) which sequentially engage and raise rounded tip portions 60 (Fig. 2) at the lower ends of the stems of heads 49, which reciprocate in supporting spider casting 64, against the action of return springs 70, between the mount being sealed and the lower end of the bulb, for puddling the seal (Fig. 1). At station "14," the seals are annealed.

A station "15," the bulb is automatically raised to remove its exhaust tube from the mount holder 58. At station "16" the leads depending from the mount are spread away from the exhaust tube to the proper angle, and at stations "17," "18" and "19" bulbs may be unloaded by hand and reversed in position where their other ends are sealed to mounts, otherwise similar to the mounts 50 except they need not be provided with exhaust tubes, whereupon the operation is repeated at stations "20" to "32," inclusive.

Lamp-holding clamp

Referring now particularlly to Figures 2, 6 and 10, there are disclosed the details of a lamp-holding clamp, generally designated by the reference character 59, one of which is used at each head 49. The clamps 59 each comprise a body 61, held by suitable means, such as a set screw 62, in adjusted positon on a normally vertical supporting rod 63 extending from the supporting spider casting 64 secured to the spider 48, as by means of bolt 65, to upper spider members 66 and 68, to which it is respectively secured in any desired manner, as by means of pins or bolts 67 and 69. For circumferential stability, the members 66 and 68 overlap and extend in opposite directions around the circumference from the upper ends of the rods 63.

The clamp body 61 carries a bearing member 71 (Figs. 2, 6 and 10), secured thereto, as by means of bolts 90, in which are journaled shafts 72 and 73. The upper end of the shaft 72 has fixed thereto a jaw member 74 (Fig. 2) and the lower end has fixed thereto a similar jaw member 75. The intermediate portion of the shaft 72 carries a block 76, secured thereto by suitable means such as a set screw 77, and from which block 76 a pin 78 outstands. The shaft 73 carries a jaw member 79 which is formed to cooperate with the jaws 74 and 75 for holding a lamp bulb 81 therebetween. The jaw member 79 projects from a hub 82 secured to the shaft 73 by suitable means, such as a set screw, and carries a bolt (Fig. 10) adjustably threaded thereinto and locked in place by a nut 84. Between the bolt 83 and the pin 78 there is provided a coil tension spring 85, which acts to bias the jaws toward closed position.

The block 76 also carries a stud 86, terminating in a ball, projecting therefrom, and the hub 82 carries a corresponding stud 87. The ball ends of these studs are received between bifurcations 88 and 89 on the top of an idler lever 91 (Fig. 10), mounted on a horizontal pivot pin 92 (Fig. 2), the ends of which are supported by the bearing member 71, thereby insuring that the jaw members 74, 75 and 79 act in unison. Automatic operation of the jaw members is obtained by having a crank 93 (Figs. 2, 6 and 10) extending from the hub of lower jaw 75 and carrying a roller 94 on its free end. When operated, the roller 94 engages one of the cams, 95 and 96 (Fig. 1), mounted on a frame portion 97 of the machine, effecting a counter-clockwise swinging of the crank 93 and opening of the jaws 74, 75 and 79. The shape of the cams, 95 and 96 (Fig. 1), is such that at stations "15" and "31," a bulb 81 held in the jaws 74, 75 and 79 is partly released for being elevated, and then again gripped, whereas at stations "1," "2," "17" and "18" the jaws are fully opened, as shown in Figure 10, for loading or unloading purposes. At stations "3" and "19" the jaws have started to close.

Top bulb holder and guide

Near the top of each rod 63 is a top bulb holder hub member 98 (Fig. 2) secured in adjusted position thereon as by means of a set screw 99, as shown in Figures 2 and 4. Each hub 98 carries a bulb holder or clamp consisting of a jaw 101 fixed thereon, as by means of bolts 102, and a jaw 103, pivoted thereto, as by means of a pin 104, and normally held in clamping engagement about a bulb 81, as by means of coil spring 105. An adjusting screw 106, held in adjusted position by a lock nut 100, is provided to limit movement of the pivoted jaw 103 toward the stationery jaw 101. The purpose of these jaws is to hold the top of a tubular lamp bulb frictionally, while neither preventing sliding movement thereof nor manual insertion and withdrawal. In order to facilitate insertion and withdrawal, the pivoted jaw 103 is provided with a beveled tip member 107.

Disposed beneath each bulb guide hub 98 is a hub 108, as shown in Figs. 2 and 5, secured to the shaft 63 by suitable means such as a set screw 109, and carrying a plate 111, provided with a notch 112 guidingly receiving an intermediate portion of a tubular bulb 81, and secured to said hub by bolts or the like 110.

Bulb gripping and raising mechanisms

After a mount 50 has been positioned at stations "1" or "2" on the holder 58 of a head 49, with its exhaust tube fitting the hollow thereof, a bulb 81 is inserted in a head of the machine, where it is initially clamped between the jaws 101 and 103 of the top hub holder and held in the proper alignment by the plate 111 of the bulb guide. It is positively held by the lamp holding clamp 59 formed by the jaws 74, 75 and 79, as it moves from station "3." While so clamped it passes through sealing fires at stations "4" and "5," the seal is puddled at stations "6," "7" and "8," the seal finished at stations "9" to "13," incl., and it then passes on, after annealing at station "14," to station "15."

Bulb gripping mechanism

The mechanism at this latter station, at the right hand side of the machine, as viewed in Figure 1, is shown most clearly in Figures 1, 2, 3, 7, 8 and 9. It is operated by a raising cam 113 and a jaw opening and closing cam 114, both turned by their carrying shaft 52. The latter cam 114 (Fig. 1) acts on an engaged roller 115, spring biased toward it, and carried by a lever 116, mounted on a pivot 117 secured to frame portion 118 of the machine. The other end of the lever 116 is pivoted to the lower end of operating rod 119 (Figs. 1, 2 and 9), the upper end of which is connected to a crank 121, secured on a shaft 122, carried by the bulb lifter base 146 (Figs. 2, 7—9), and to which is fixed a gear segment 123 meshing with a rack 124. The rack 124 is adjustably secured as by means of screws 120, to an upper slide plate 125, slidably mounted on a lower guide plate 126 (slidable on base 146), and biased toward the right with respect thereto by means of coil compression springs 127.

These springs are respectively mounted on bolts 128, the inner ends of which are threadably connected to the lower plate 126, and upon which an end plate 129, secured to the upper slide plate 125, slides.

The guide plate 126 has pivotally mounted thereon a pair of jaws 131 and 132 (Figs. 2, 7 and 8), carrying resilient rubber inserts or plugs 133, so that they will frictionally grip without breaking a tubular bulb 81. The inserts 133 may be held in place between the upper and lower flanges of U-shaped metal holders 130, the webs of which are held against the outer surfaces of the jaws 131 and 132 as by means of bolts 140. The jaws 131 and 132, respectively have extensions 134 and 135, rearward or outward of their respective pivot pins 136 and 137, and the extreme ends of which carry rollers 138 and 139 engageable by a spreader formed by wedges 141 and 142, mounted on the upper slide plate 125. Upon movement of said upper plate with the spreader toward the left, as viewed in Figures 2, 7 and 8, the jaws are moved against the action of biasing coil spring 143, which holds them in normally open position, illustrated in Figure 7, to closed position, illustrated in Figure 8.

Figure 8:
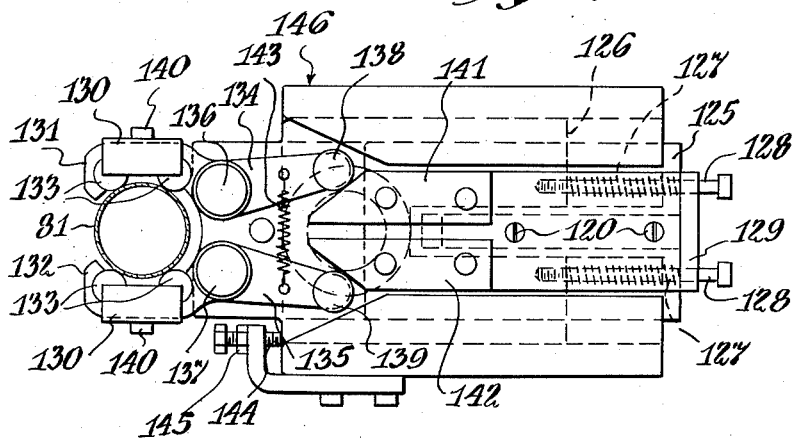
Figure 8 is a view corresponding to Figure 7, but showing said jaws closed and in lamp-gripping position.
Figure 9:
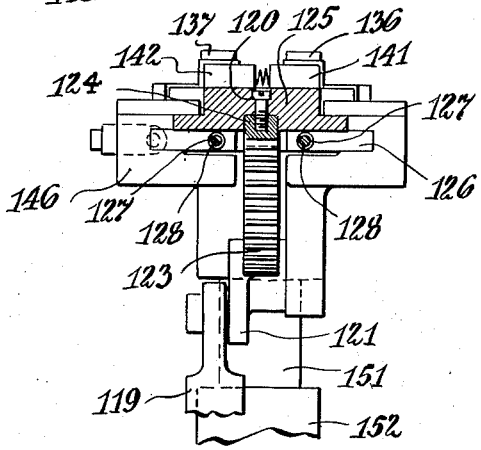
Figure 9 is a vertical sectional view on the line IX—IX of Figure 2, in the direction of the arrows.

The lower guide plate 126 is slidable from the position shown in Fig. 7, to that shown in Fig. 8, where it is prevented from further movement to the left by a bolt 144, held in adjusted position by lock nut 145. Further turning of the gear segment 123 in a counter-clockwise direction results in movement to the left of the wedges 141 and 142 with the top plate 125, against the action of coil compression springs 127 which are thereby further compressed, and the jaws 131 and 132 are forced together against the action of the release spring 143, so that they then grip a bulb 81, if in place, as illustrated in Figure 8.

Bulb Raising Mechanism

After this has taken place, the whole base 146, the plates 125 and 126 which slide therein, and the gear segment 123, are bodily raised, from the position shown in full lines to that in dotted lines in Figure 2, by operation of the cam 113 acting on roller 147 (Fig. 1) carried by lever 148 pivoted to the frame portion 118 on pivot pin 117, and its other end carrying a gear segment 150 (Fig. 3) meshing with a rack 149 mounted on the lower end of the bulb raising operating rod 151 which carries the lifter base 146, said rod being slidable in a sleeve 152 mounted on the frame portion 56.

The cam 114, which moves with the cam 113, is appropriately formed so that as the lifter base 146 rises, the gripping jaw operating rod 119 is allowed to rise to the same extent therewith, the roller 115 on the lever 116 moving for that purpose down to the cam portion of smaller diameter. The bulb, after being so elevated, is left in that position where it is held by the jaws 74, 75, 79, 101 and 103. The raising jaws 131 and 132 are thereafter first opened and then retracted to the position illustrated in Fig. 7, and finally lowered to the initial position shown in Fig. 2, ready for repetition of the operation.

Lead-wire spreading mechanism

When the bulb is indexed at station "16," the lead wire spreading station, the leads 153 and 154 (Fig. 11), depending on opposite sides of the exhaust tube 155, are separated from one another by the mechanism shown most clearly in Figs. 1 and 11 to 17, inclusive. Said mechanism is operated by a cam 156 turning with shaft 47 (Figs. 1 and 12) and acting on a roller 157 carried by bell crank lever 158, turning about pivot pin 159, mounted on a bracket 161 extending from the frame portion of the machine. The free end of the other arm 162 of the bell crank lever 158 is pivoted to the lower end of an operating rod 163 (Figs. 11 and 12), the upper end of which is pivoted to an arm 164 on and extending laterally from a lever 165, turning about a pivot 166 (Fig. 11) held in a frame portion of the machine.

The upper end of the lever 165 is provided with bifurcations 167 and 168 (Fig. 11) leaving therebetween a notch 169 which receives a pin 171 mounted on and spaced from the lower surface of a slide plate 172, which is slidably mounted on a spreader base member 173, secured to the frame of the machine. The plate 172 is biased to the right, as viewed in Fig. 11, by a coil spring 174 acting between a pin 175 projecting therefrom, and a pin 176 projecting from a slidable prong-carrying plate 177. Said prong plate 177 is provided with a stop pin 178 engageable by a stop lug 179 secured to the spreader base member 173, as by means of bolts or screws 181, at the extreme inner end of its travel, where the prongs or fingers 182 and 183 (Figs. 14–17), carried thereby, lie between depending leads 153 and 154, as viewed in Fig. 14 and shown in dotted lines in Fig. 11.

These fingers 182—183 are actuated by a rod 184 guided in a hollow column 185 mounted on the prong plate 177 (Fig. 11). The rod 184 carries a head 186 (Fig. 14), provided with bifurcations 187 and 188 having slots which respectively receive rearward extensions 189 and 191 of bell crank levers 192 and 193. These levers are respectively secured to the column 185 by, and are pivoted about, pins 194 and 195.

Thus, upon turning of the wire spreading cam 156 (Fig. 1), the lever 165 swinging counterclockwise (Fig. 11), first moves both slide plate 172 and prong plate 177 to the left, until the prong plate 177 is stopped on engagement of its pin 178 with the stop member 179. Movement of the lower slide plate 172 continues, together with a further turning of a bell crank lever 196 (Figs. 11 and 13), swinging on fixed pivot 197, and operated by link 198, the ends of which are respectively connected to lever 165 and the right hand arm of the bell crank lever 196, as viewed in Fig. 11. Such swinging of the bell crank lever 196, results in engagement of the end 199 thereof with the lower end of the operating rod 184, then in the dotted line position of Fig. 11, effecting a raising of said rod and a corresponding outward swinging of the normally vertical arms of the bell crank levers 192 and 193, which carry the prongs or fingers 182 and 183, moving then outwardly to the position of Figs. 15 and 17, and correspondingly bending the leads 153 and 154 to the position illustrated in Fig. 15.

Upon accomplishing this, the bell crank levers 192 and 193 are swung back to the position of Figs. 14 and 16, and withdrawn to the full-line position of Fig. 11, thereupon freeing the bulb 81 for removal to the next stations, "17," "18" and 19." At one of said stations it may be withdrawn and reversed in position, being placed on another mount, which need not be tubulated, for a repetition of the operation at stations "20" to "32," inclusive.

Duplicate wire spreading mechanism

The lower end of the lever 165 is operably connected to corresponding mechanism at station 32, as by means of connecting rod 201 (Fig. 11), one end of which is connected by a pivot pin 202 to the lower end of member 165. The other end of rod 201 is connected by pivot pin 203 to the lower end of lever 204, connected to the frame of the machine by pivot 205 and carrying a gear segment 206. The gear segment 206 meshes with a corresponding gear segment 207 on a lever 208, connected to the frame of the machine by pivot 209. The upper end of lever 208 is provided with bifurcations 167a and 168a, leaving a notch 169a which receives a pin 171a mounted on and spaced from the slidable plate 172a, corresponding with the slidable plate 172, at the right side of the machine as viewed in Fig. 11.

It will be seen that the wire spreading mechanism at the left side of Fig. 10 is otherwise identical with that at the right side of said figure. The corresponding parts of said mechanism, identified by corresponding numbers with the suffix "a," need not therefore be otherwise described in detail. The variation, involving the gear segments 206 and 207 for connecting levers 204 and 208, instead of a single lever 165, is necessary in order to make the slides move toward and away from one another simultaneously.

*Operation*

From the foregoing description of the apparatus for effecting union between tubular bulbs 81 and mounts 50 at opposite ends thereof, it will be seen that only two operators, one at the left side and one at the right side of the machine, as viewed in Figure 1, are necessary for effecting the desired steps, as follows:

1. With the spider heads 49 indexing from station to station, at one of stations "1," "2" and "3," a mount 50 is placed in each holder 58 and a bulb 81 positioned thereover, with its upper end gripped between top bulb holder jaws 101 and 103. As the bulb 81 passes from station "3," the clamping jaws 74, 75 and 79 are closed tightly thereabout by operation of the cam 95 (Fig. 1).

2. At stations "4" and "5," suitable sealing fires heat each mount 50 and the lower end of its associated bulb 81, softening them sufficiently so that they start to seal together, the seal being subjected to puddling at stations "6," "7" and "8," and finished at stations "9" to "13," inclusive.

3. At station "14," each formed seal is subjected to the action of annealing fires.

4. At station "15," the gripping and lifting jaws 131 and 132, after moving horizontally while open a distance indicated in Fig. 2 by the arrow 210, close about and raise the bulb a distance indicated with the arrow 211 (Fig. 2). These jaws 131—132 thereafter open and move back a distance indicated by the arrow 212 (Fig. 2), and return through a distance indicated by the arrow 213 (Fig. 2). The bulb 81 during the lifting operation is slightly released by the action of cam 95 on the clamping jaws 74, 75 and 79, said jaws (after the raising the bulb) clamping tightly thereabout while said bulb is being indexed to station "16."

5. At station "16," each bulb has its lead wires 153 and 154, depending on opposite sides of exhaust tube 155, bent outwardly, by separation of prongs or fingers 182 and 183, to the position illustrated in Figures 15 and 17.

6. At one of stations "17" "18" and "19," each bulb 81 and its connected mount 50 is removed, reversed end to end, and replaced, between the top bulb holder jaws 101 and 103, and clamping jaws 74, 75 and 79, above a mount 50 which in this instance need not have an exhaust tube. Said mount 50, however, is held on a mount holder 58. The clamping jaws 74, 75 and 79 close tightly about the reversed bulb 81 as it passes from station "19" and the operations of sealing, puddling, annealing, raising and spreading are repeated at stations "20" to "32" inclusive.

7. At one of stations "1," "2" and "3" the bulb 81, this time with a mount 50 sealed to each end thereof, is completely withdrawn and replaced by a tubulated mount 50 supported on a holder 58, above which is disposed a bulb 81 open at both ends. The entire process is then repeated.

Although a preferred embodiment of my invention has been disclosed, it will be understood that modifications within the scope of the invention may occur to those skilled in the art.

I claim:

1. In combination for a tubular lamp sealing machine, a lamp clamping mechanism and a bulb gripping and raising mechanism: said clamping mechanism having a support, a body on said support, a plurality of lamp clamping jaws pivoted on said body and spring biased to the closed position for holding a bulb with its axis vertical, and means operatively associated with said clamping jaws for causing said clamping jaws to open for loading, unloading and reloading a bulb therein and to partly release said bulb at the proper time to allow said bulb to be elevated above sealing position by said gripping and raising mechanism; said gripping and raising mechanism having a base, a guide plate slidable on said base, gripping jaws pivoted on said guide plate, said gripping jaws being spring biased to open position and having roller carrying rear extensions, means operatively connected to said gripping jaws for moving said gripping jaws toward and away from said bulb, means movable horizontally between rollers on said jaw extensions for effecting opening and allowing closing of said gripping jaws about said bulb, and means operatively connected to said base for raising and lowering said gripping jaws.

2. In combination for a tubular lamp sealing machine, a lamp clamping mechanism and a bulb gripping and raising mechanism: said clamping mechanism having a support, a body on said support, a plurality of lamp clamping jaws pivoted on said body and spring biased to the closed position for holding a bulb with its axis vertical, a bulb guide on said support for guiding the upper portion of said bulb, a bulb holder on said support for frictionally holding the upper portion of said bulb, and means operatively associated with said clamping jaws for causing said clamping jaws to open for loading, unloading and reloading a bulb therein and to partly release said bulb at the proper time to allow said bulb to be elevated above sealing position by said gripping and raising mechanism; said gripping and raising mechanism having a base, a guide plate slidable on said base, gripping jaws pivoted on said guide plate, said gripping jaws being spring biased to open position and having roller carrying rear extensions, means operatively connected to said gripping jaws for moving said gripping jaws toward and away from said bulb, means movable horizontally between rollers on said jaw extensions for effecting opening and allowing closing of said gripping jaws about said bulb, and means operatively connected to said base for raising and lowering said gripping jaws.

References Cited in the file of this patent

UNITED STATES PATENTS

| | | |
|---|---|---|
| 1,816,683 | Ledig | July 28, 1931 |
| 1,821,894 | Otaka | Sept. 1, 1931 |
| 1,935,248 | Malloy | Nov. 14, 1933 |
| 2,069,386 | Palucki | Feb. 2, 1937 |
| 2,085,678 | Flaws | June 29, 1937 |
| 2,120,877 | Uber | June 14, 1938 |
| 2,262,901 | Murphy | Nov. 18, 1941 |
| 2,297,950 | Flaws | Oct. 6, 1942 |
| 2,359,500 | White | Oct. 3, 1944 |
| 2,387,074 | Hroch | Oct. 16, 1945 |
| 2,508,979 | Van Gessel | May 23, 1950 |
| 2,525,043 | Nelson et al. | Oct. 10, 1950 |
| 2,554,013 | Cooper | May 22, 1951 |
| 2,590,904 | Titus | Apr. 1, 1952 |
| 2,650,634 | Young | Sept. 1, 1953 |
| 2,711,791 | Bechard | June 28, 1955 |